A. GASPARICH.
ADJUSTABLE IRREGULAR CURVE.
APPLICATION FILED JUNE 19, 1909.
962,896.
Patented June 28, 1910.
2 SHEETS—SHEET 1.
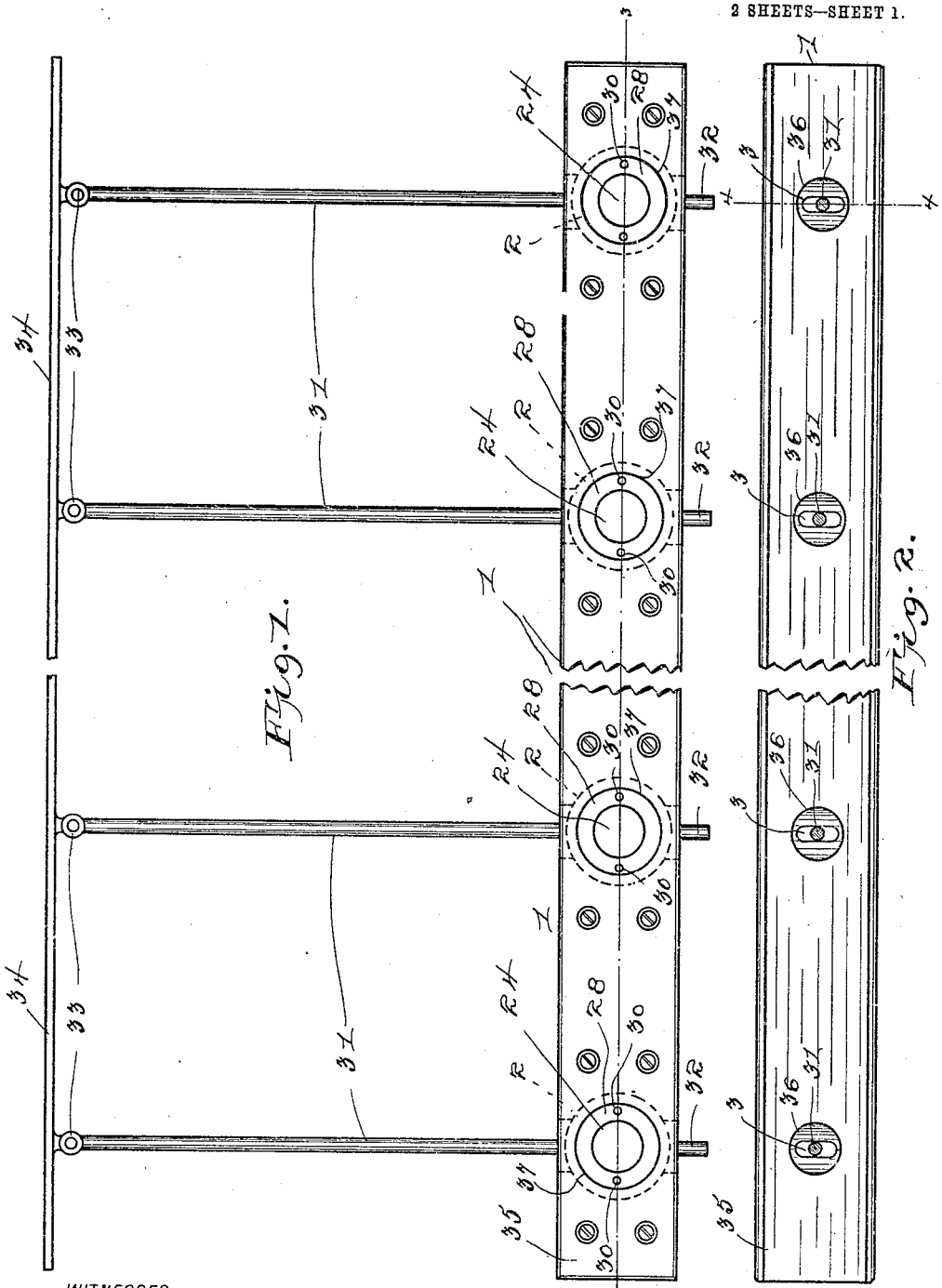
WITNESSES:
J. D. McLaughlin
Harry C. Schroeder
INVENTOR
Anton Gasparich.
BY
Trooman
ATTORNEY.

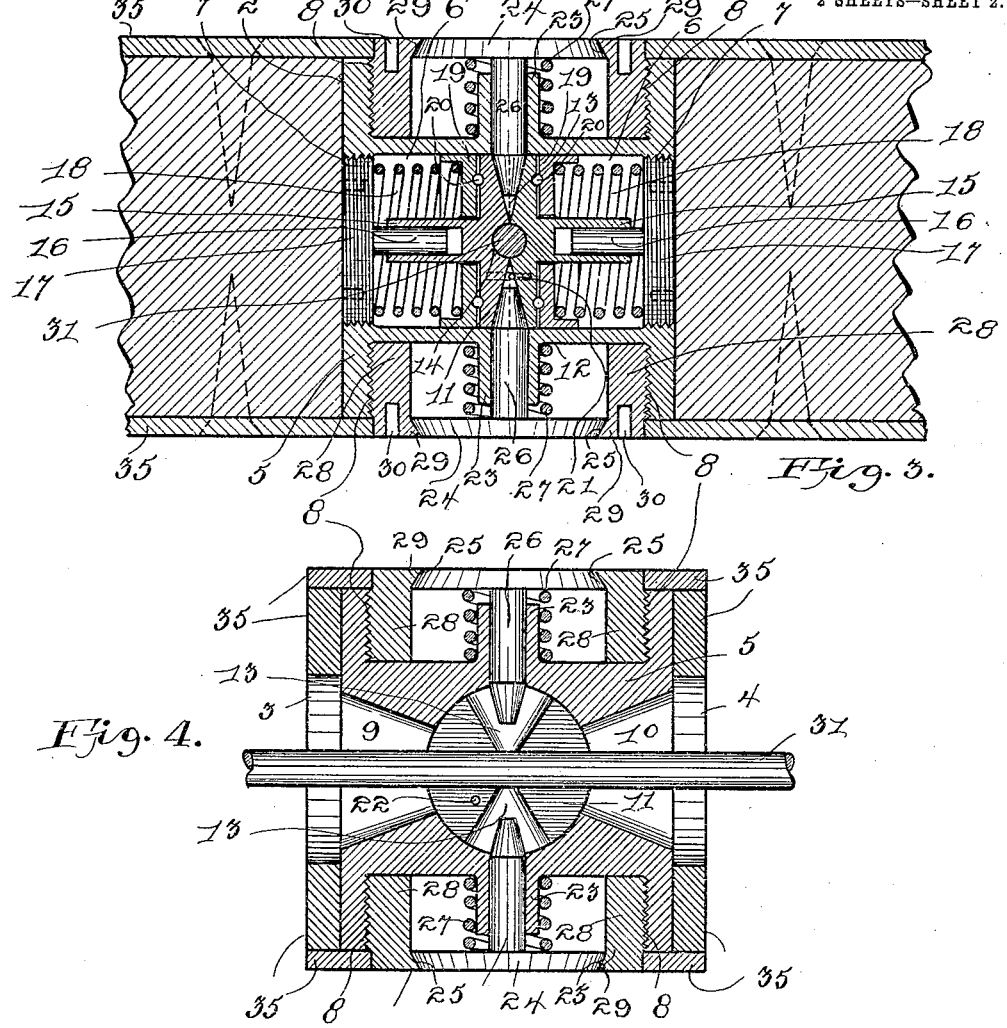

UNITED STATES PATENT OFFICE.

ANTON GASPARICH, OF OAKLAND, CALIFORNIA.

ADJUSTABLE IRREGULAR CURVE.

962,896. Specification of Letters Patent. Patented June 28, 1910.

Application filed June 19, 1909. Serial No. 503,242.

*To all whom it may concern:*

Be it known that I, ANTON GASPARICH, citizen of the United States, residing at Oakland, in the county of Alameda and State of California, have invented certain new and useful Improvements in Adjustable Irregular Curves, of which the following is a specification, reference being had therein to the accompanying drawing.

This invention relates to drawing instruments, and has specially in view a rule or straight edge having a plurality of independent adjustable connections with a bar or support whereby said rule may be flexed to adapt it for use in connection with drawing irregular curves.

With the above principal object of the invention in view, it is contemplated employing a bar or base which is provided with a plurality of adjustable casings each of which is provided with a slidable rod, said rods projecting beyond said bar and having a pivotal connection with a flexible rule or straight edge.

In carrying out the invention as generally stated above it will, of course, be understood that the essential features of the same are susceptible of changes in details and structural arrangements, but a preferred and practical embodiment of the same is shown in the accompanying drawings, wherein—

Figure 1 is a top plan view of the improved instrument. Fig. 2 is a side elevation thereof. Fig. 3 is a longitudinal sectional view taken on the line 3—3, Fig. 1. Fig. 4 is a vertical sectional view taken on the line 4—4, Fig. 2. Fig. 5 is a view in side elevation of one of the adjusting casings.

Referring to said drawings by numerals, 1 designates the supporting bar or base which is provided with a plurality of regularly spaced apart cylindrical openings 2 which extend vertically through the same and are intersected by openings 3 and 4 which project from opposite sides of the bar. Each cylindrical opening 2 has loosely mounted therein a cylindrical casing 5 provided with a central tubular opening 6 which extends transversely through said casing and has its ends internally threaded as indicated at 7. The casing is also internally threaded at each of its ends, as indicated at 8, and is provided with oppositely disposed inwardly tapering slots 9 and 10 which aline with the openings 3 and 4 of the bar 1, as shown in Fig. 3 and communicate with the central tubular opening 6. A pair of clamping jaws 11—12 are mounted in opposed relation in said tubular opening 6, the meeting faces of said jaws being provided with complemental wedge-shaped recesses 13 and with a central groove which forms a guiding opening 14 through said jaws. Each jaw carries a centrally located outstanding socket 15 which is engaged by a guiding shank 16 of a threaded cap 17 which seals the ends of said tube 6. A spring 18 is coiled about each socket and shank, one end of said springs bearing against the end caps 17 their other ends being seated in flanged washers 19 loosely mounted on said sockets. Anti-friction bearings 20 are interposed between said washers and the clamping jaws to permit free movement of said jaws relatively to said washers. One of the jaws is provided with a guiding lug 21 which enters an opening 22 in the other jaw to hold the same in alinement.

The cylindrical casing is provided within each end portion with a centrally located upstanding tube 23 which communicates with the wedge shaped recesses 13 of the jaws 11—12. A cap 24, provided with a beveled periphery 25, carries a wedge shaped shank 26 which enters the tubes 23 and is adapted to be forced into the recesses 13 of the jaws 11—12 to force them apart. A spring 27 is coiled about each tube 23 and is normally exerting a pressure against the caps 24 to cause their shanks to be removed from between the jaws 11—12. The caps are held within the ends of the casing by means of the annular rings 28 which engage with the threads of said casing, each ring being provided with an inwardly projecting beveled flange 29 which engages with the beveled periphery of the said caps, as is shown in Figs. 3 and 4. Said rings project about the ends of the casing and are provided with oppositely disposed openings 30 by means of which they may be rotated to disengage them from the casing or adjust them therein, as will be obvious.

An adjusting rod 31 extends through the central guiding opening of the jaws 11—12 and through the tapering slots of the casing and the openings of the bar 1, one end of the said rod forming a handle 32, the other end projecting well beyond the bar 1 and having a pivotal connection 33 with a flexible rule or straight edge 34.

The bar 1 is reinforced on its sides by means of metal plates, as indicated at 35, said plates being provided with openings 36—37, which, respectively, surround the rods 31, and project over the ends of the casings 5 and surround the rings 28.

It will be seen from the foregoing that as the casings are fitted loosely within the bar 1, said casings are capable of rotation about their axes, thus giving each rod 31 a universal connection with the bar. And it will be also understood that each rod may be adjusted longitudinally through its casing when necessary by pressing inward the caps 24 which forces the wedge-shaped shanks between the opposed gripping and holding jaws, separating said jaws against the tension of their springs, and thereby freeing said rods. As soon as the pressure is removed from the caps, the springs will restore them to their normal position, and the springs of the jaws will force said jaws to their rod-gripping positions.

As the rule or straight edge is flexible, it will be readily understood that it may be flexed to various shapes by the described independent connection of each rod with the bar 1, so as to permit the rule to be used in connection with any type of irregular curve.

What I claim as my invention is:—

1. An instrument of the character described comprising a bar provided with a plurality of openings, a casing mounted for rotative movement in each opening, a flexible rule, and a plurality of parallel rods each having an independent adjustable connection with one of said casings and an independent pivotal connection with said rule.

2. An instrument of the character described comprising a bar provided with a plurality of transverse openings, a casing mounted in each opening and adapted for rotative movement therein, means for retaining said casings in said openings, a flexible rule, and a plurality of parallel rods each having an adjustable connection with one of said casings and a pivotal connection with said rule.

3. An instrument of the character described comprising a bar provided with a plurality of independently movable casings, gripping jaws carried by each casing, a flexible rule, and a plurality of parallel rods adjustably held within said casings by said jaws and each having an independent pivotal connection with said rule.

4. An instrument of the character described comprising a bar, a plurality of independently movable casings in said bar, a pair of spring-pressed gripping jaws carried by each casing, a rod projecting through said bar and said casing and normally held by said jaws, a flexible rule, a pivotal connection between each rod and said rule, and means carried by said casing for separating said jaws to permit longitudinal adjustments of said rods.

5. An instrument of the character described comprising a bar, a plurality of casings rotatably mounted therein, opposed spring-pressed gripping jaws carried by each casing, a plurality of parallel rods arranged one for each casing and normally held therein by said jaws, a flexible rule having an independent pivotal connection with each rod, and means carried by said casings for separating said jaws to permit longitudinal adjustments of said rods.

6. An instrument of the character described comprising a bar provided with a plurality of vertical openings and intersecting horizontal openings, a casing mounted in each vertical opening and provided with slots registering with the horizontal openings of the bar, spring pressed gripping jaws in said casing, rods passing through said horizontal openings of the bar and slots of the casings and engaged by the jaws therein, a flexible rule having a pivotal connection with each rod, and a spring-pressed wedge carried by each casing for separating the jaws therein to permit longitudinal adjustments of the said rods.

7. An instrument of the character described comprising a bar provided with a plurality of vertical openings and intersecting horizontal openings, a casing mounted in each vertical opening and provided with transverse slots registering with the horizontal openings of the bar, opposed spring pressed gripping jaws slidably mounted in said casings, a rod passing through the horizontal openings of the bar and slots of the casing, a flexible rule, and independent pivotal connection between each rod and said rule, and spring pressed wedge-shaped shanks carried by said casings and adapted to separate said jaws to permit longitudinal adjustments of said rods.

8. An instrument of the character described comprising a bar, a plurality of rotatably mounted casings within said bar, a rod projecting through each of the said casings, and having a longitudinally adjustable connection therein, and a flexible rule having an independent pivotal connection with said rods.

9. An instrument of the character described comprising a bar, a rule, a rod having an adjustable connection with said bar, means for releasing said connection, and means for automatically returning said connection to normal position when released, said rod having a pivotal connection with said rule.

10. An instrument of the character described comprising a bar, a plurality of casings mounted in said bar, clamping jaws in each casing, a rod projecting through each casing, and normally clamped by said jaws, a rule having a pivotal connection with said rods, and means carried by each casing for separating the clamping jaws therein so that the rod held thereby may be adjusted.

11. An instrument of the character described comprising a bar, a plurality of casings mounted therein, clamping means in each casing, an adjusting rod projecting through each casing and normally engaged by the jaws therein, a rule having a pivotal connection with said rods, and a spring pressed wedge slidably mounted in each casing and adapted to release the clamping means therein.

12. An instrument of the character described comprising a bar, a plurality of casings rotative therein, clamping jaws mounted therein, a rod for each casing and normally gripped by said jaws, means for causing said jaws to release said rod, means for automatically returning said jaws to their gripping position, and a rule pivotally connected to said rods.

13. An instrument of the character described comprising a bar, independent casings mounted therein and capable of rotative movement, clamping jaws in each casing, springs for normally retaining said jaws in clamping relation, means for separating said jaws against the tension of their springs, a rod projecting through each casing and normally gripped by said jaws, and a rule pivotally connected to said rods.

14. An instrument of the character described, comprising a bar, independent casings therein, a pair of opposed clamping jaws slidably and rotatably mounted in each casing, means for normally holding said jaws in clamping relation, wedging shanks slidable in said casings and adapted to be manually forced between said jaws to separate the same, means for automatically withdrawing said shanks from the jaws, a rod extending through each casing and between the jaws therein, and a rule having an independent pivotal connection with each rod.

In testimony whereof I hereunto affix my signature in presence of two witnesses.

ANTON GASPARICH.

Witnesses:
F. P. SCHROEDER,
H. C. SCHROEDER.